(12) United States Patent
Noh et al.

(10) Patent No.: US 8,855,090 B2
(45) Date of Patent: Oct. 7, 2014

(54) PACKET TRANSMISSION SYSTEM BASED ON WIRELESS PERSONAL AREA NETWORK AND METHOD THEREOF

(75) Inventors: Jae Yeon Noh, Seongnam-si (KR); Moon Kee Kim, Yongin-si (KR); Cheol Ho Yim, Daejeon (KR); Kyung Sik Han, Yongin-si (KR); Keun Hwan Choi, Seoul (KR); Jae Hwang Yu, Seoul (KR); Min Seok Kim, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 155 days.

(21) Appl. No.: 13/386,887

(22) PCT Filed: Oct. 27, 2009

(86) PCT No.: PCT/KR2009/006224
§ 371 (c)(1),
(2), (4) Date: Mar. 16, 2012

(87) PCT Pub. No.: WO2011/010776
PCT Pub. Date: Jan. 27, 2011

(65) Prior Publication Data
US 2012/0163362 A1    Jun. 28, 2012

(30) Foreign Application Priority Data

Jul. 24, 2009  (KR) .......................... 10-2009-0067809

(51) Int. Cl.
*H04W 4/00* (2009.01)
*H04W 28/06* (2009.01)
*H04J 3/24* (2006.01)
*H04B 7/14* (2006.01)
*H04J 1/10* (2006.01)
*H04J 3/08* (2006.01)
*G06F 15/16* (2006.01)

(52) U.S. Cl.
CPC ...................................... *H04W 28/06* (2013.01)
USPC ............ 370/338; 370/349; 370/315; 709/219

(58) Field of Classification Search
USPC ............... 370/349, 315; 340/825.52; 709/219
See application file for complete search history.

(56) References Cited

U.S. PATENT DOCUMENTS

| RE40,459 E | 8/2008 | Hawkins et al. |
|---|---|---|
| 2006/0088051 A1 | 4/2006 | Mulligan |

(Continued)

FOREIGN PATENT DOCUMENTS

| KR | 10-0767394 | 10/2007 |
|---|---|---|
| KR | 10-2009-0004241 | 1/2009 |
| KR | 10-2009-0027943 | 3/2009 |

OTHER PUBLICATIONS

International Search Report mailed Aug. 19, 2010 for PCT application No. PCT/KR2009/006224, citing the above reference(s).

(Continued)

*Primary Examiner* — Helal A Algahaim
*Assistant Examiner* — Mahmoud Ismail
(74) *Attorney, Agent, or Firm* — Lowe Hauptman & Ham, LLP

(57) ABSTRACT

Disclosed is a network interworking system and method. That is, a header size is minimized through a fragment of an IPv4 packet based IP packet and a header compression and it is implemented such that the IPv4 is loaded in an IEEE 802.15.4 MAC/PHY packet having a small payload, so that it is possible to efficiently transmit an IPv4 packet by using an IEEE 802.15.4 based WPAN. Further, various applications can be executed using the IPv4 while using an IEEE 802.15.4 technology, which is a low power communication technology, in a mobile device.

16 Claims, 8 Drawing Sheets

(56) References Cited

U.S. PATENT DOCUMENTS

| | | | |
|---|---|---|---|
| 2007/0030848 A1 | 2/2007 | Miyata et al. | |
| 2008/0259902 A1* | 10/2008 | Park | 370/349 |
| 2009/0046621 A1* | 2/2009 | Kimura et al. | 370/315 |
| 2009/0146833 A1* | 6/2009 | Lee et al. | 340/825.52 |
| 2009/0185549 A1* | 7/2009 | Shon et al. | 370/349 |
| 2012/0226782 A1* | 9/2012 | Hawkins et al. | 709/219 |

OTHER PUBLICATIONS

Korean Office Action mailed May 13, 2011 for Korean Patent Application No. 10-2009-0067809.

Korean Notice of Allowace mailed Dec. 16, 2011 for Korean Patent Application No. 10-2009-0067809.

Chang-Yeol Yum et al; Methods to use 6LoWPAN in IPv4 network; ICACT2007; Feb. 12-14, 2007; pp. 969-972 (4 pages); ISBN 978-89-5519-131-8 93560.

G. Montenegro, N. Kushalnagar, J. Hui & D. Culler, "Transmission of IPv6 Packets over IEEE 802.15.4 Networks", Sep. 2007, pp. 1-30, The IETF Trust.

Chinese Office Action for application No. 200980161625.3 dated Feb. 24, 2014, citing the above reference(s).

* cited by examiner

FIG. 3

| + | Bits 0-3 | 4-7 | 8-15 | 16-18 | 19-31 |
|---|---|---|---|---|---|
| 0 | Version | Header Length | Type of Service (now DiffServ and ECN) | Total Length | |
| 32 | Identification | | | Flags | Fragment Offset |
| 64 | Time to Live | | Protocol | Header Checksum | |
| 96 | Source Address | | | | |
| 128 | Destination Address | | | | |
| 160 | Options | | | | |
| 160 or 192+ | Data | | | | |

FIG. 5

| O.<br>Flag | O.addr<br>mode | F.<br>Flag | F.addr<br>mode | Final<br>addr |
|---|---|---|---|---|
| 0b0 | 0b000 | 0b1 | 0b001 | 158 |

(a)

| O.<br>Flag | O.addr<br>mode | F.<br>Flag | F.addr<br>mode | Origin<br>addr |
|---|---|---|---|---|
| 0b1 | 0b001 | 0b0 | 0b000 | 205 |

(b)

| O.<br>Flag | O.addr<br>mode | F.<br>Flag | F.addr<br>mode | Final<br>addr |
|---|---|---|---|---|
| 0b0 | 0b000 | 0b1 | 0b011 | 206.190.60.37 |

(c)

| O.<br>Flag | O.addr<br>mode | F.<br>Flag | F.addr<br>mode | Origin<br>addr |
|---|---|---|---|---|
| 0b1 | 0b011 | 0b0 | 0b000 | 206.190.60.37 |

| 8bits | 0/16bits | 8bits | Variable |
|---|---|---|---|
| TOS | Total length | TTL | Option |

UNCOMPRESSED FIELD (PACKET IS NOT FRAGMENTED)

| 8bits | 16bits | 16bits | 3bits | 13bits | 8bits | Variable |
|---|---|---|---|---|---|---|
| TOS | Total Length | Identification | flag | Frag offset | TTL | Option |

UNCOMPRESSED FIELD (PACKET IS FRAGMENTED)

PACKET TRANSMISSION SYSTEM BASED ON WIRELESS PERSONAL AREA NETWORK AND METHOD THEREOF

CROSS REFERENCE TO RELATED APPLICATION

This application claims the priority of Korean Patent Application No. 10-2009-0067809, filed on Jul. 24, 2009 in the KIPO (Korean Intellectual Property Office). Further, this application is the National Phase application of International Application No. PCT/KR2009/006224, filed on Oct. 27, 2009, which designates the United States and was published in Korean.

FIELD OF THE INVENTION

The present invention relates to a network interworking method, and more particularly to a system and method for transmitting a packet based on a wireless personal area network, which is implemented so that an IPv4 based IP packet can be loaded in an IEEE 802.15.4 MAC/PHY packet having a small payload by minimizing a size of a header through a fragment of the IPv4 based IP packet and a compression of the header.

DESCRIPTION OF THE PRIOR ART

Among various Wireless Personal Area Network (WPAN) technologies, there have been many attempts to apply an IEEE 802.15.4 standard, which is a standard defining an MAC/PHY layer for local area low rate and low power communication, to various sensors and mobile terminals due to its low power characteristic.

Much research on a method that enables various Internet applications to be used through the IEEE 802.15.4 standard including an Internet Protocol (IP) layer loaded on an upper layer therein, are in progress, and in particular, a technology such as a 6LoWPAN is being actively developed.

The 6LoWPAN uses a variety of omission and compression mechanisms for loading an IPv6 packet on an upper layer of the IEEE 802.15.4 MAC/PHY layer, and accordingly, an IPv6 header having a large size can be effectively loaded in the IEEE 802.15.4 standard having a small payload size.

However, the 6LoWPAN uses an IPv6 (compatible with an IPv4) instead of an IPv4 used in the current Internet environment, and the IPv6 has a lower efficiency in comparison with the IPv4 since the IPv6 has larger sizes of header fields such as an address size.

That is, the 6LoWPAN allocates an IP address to all sensor devices using the IEEE 802.15.4, and uses the IPv6 in order to enable the sensors to directly communicate with an IP network. However, it may be more efficient to use the IPv4 when a private IP is allocated to the IEEE 802.15.4 devices instead of a static IP and the devices have the capability to access the Internet through a gateway.

SUMMARY OF THE INVENTION

Accordingly, the present invention has been made to solve the above-mentioned problems occurring in the prior art, and an aspect of the present invention provides a system and method for transmitting a packet based on a wireless personal area network, which is implemented such that an IPv4 based IP packet can be loaded in an IEEE 802.15.4 MAC/PHY packet having a small payload by minimizing a size of a header through a fragment of the IPv4 based IP packet and a compression of the header so that the IPv4 packet can be transmitted using an IEEE 802.15.4 based WPAN.

In accordance with an aspect of the present invention, there is provided a system for transmitting a packet based on a Wireless Personal Area Network (WPAN), the system comprising: a packet transferring apparatus for generating a converted packet supporting a WPAN by compressing one or more preset fields to be compressed, which are included in an IP packet header to be transmitted, to a predetermined number of bits and eliminating a field to be eliminated, which is designated differently in the IP packet header according to whether the IP packet is fragmented, and transmitting the converted packet according to a destination address included in the fields to be compressed; and a packet receiving apparatus for receiving the converted packet, recovering the one or more preset fields to be compressed of the converted packet, and restoring the field to be eliminated of the converted packet, which is eliminated differently according to whether the IP packet is fragmented.

The packet transferring apparatus may designate the destination address as a WPAN based address when the packet receiving apparatus is located inside the WPAN.

The packet transferring apparatus may designate the destination address as an IP based address when the packet receiving apparatus is located outside the WPAN.

The packet transferring apparatus may compress the IP packet header according to the IPv4 in upper layer of a Protocol Adaptation Layer (PAL) based on function of the Protocol Adaptation Layer to generate the converted packet, and transfers the converted packet to an IEEE 802.15.4 MAC/PHY layer located in a lower layer of the Protocol Adaptation Layer to interwork with the WPAN.

In accordance with another aspect of the present invention, there is provided a packet transferring apparatus comprising: a header compressor for fragmenting an IP packet to be transmitted and compressing one or more preset fields to be compressed, which are included in an IP packet header, to a predetermined number of bits; a packet generator for eliminating a field to be eliminated, which is designated differently in the IP packet header according to whether the IP packet is fragmented, thereby generating a converted packet supporting a WPAN; and a packet transmitter for transmitting the converted packet according to a destination address included in the fields to be compressed.

The header compressor may compress the IP packet header according to MPEG2-TS in upper layer of a Protocol Adaptation Layer (PAL) based on function of the Protocol Adaptation Layer.

The header compressor may designate the destination address as a WPAN based address when the converted packet is transmitted into the WPAN.

The header compressor may designate the destination address as an IP based address when the converted packet is transmitted outside the WPAN.

The packet transmitter may transfer the converted packet to an IEEE 802.15.4 MAC/PHY layer located in a lower layer of a Protocol Adaptation Layer to interwork with the WPAN.

In accordance with another aspect of the present invention, there is provided a method of transmitting a packet based on a WPAN, the method comprising: selectively fragmenting an IP packet to be transmitted in consideration of a packet size by a packet transferring apparatus; compressing one or more fields to be compressed, which are included in a IP packet header, to a predetermined number of bits by the packet transferring apparatus; eliminating a field to be eliminated, which is designated differently in the IP packet header according to whether the IP packet is fragmented, thereby generating a converted packet supporting a WPAN by the packet transferring apparatus; transmitting the converted packet according to a destination address included in the fields to be compressed, by the transferring apparatus; recovering the one or more preset fields to be compressed of the converted packet through an analysis of a header of the converted packet by the packet receiving apparatus; and restoring the field to be eliminated of the converted packet, which is eliminated differently according to whether the IP packet is fragmented, by the packet receiving apparatus.

The destination address may be designated as a WPAN based address when the packet receiving apparatus is located inside the WPAN.

The destination address may be designated as an IP based address when the packet receiving apparatus is located outside the WPAN.

The step of compressing one or more fields to be compressed may be the step of compressing the IP packet header according to the IPv4 in upper layer of a Protocol Adaptation Layer (PAL) based on function of the Protocol Adaptation Layer.

The step of transmitting the converted packet may be the step of transmitting the converted packet to an IEEE 802.15.4 MAC/PHY layer located in a lower layer of the Protocol Adaptation Layer in the transferring apparatus to interwork with the WPAN.

In accordance with another aspect of the present invention, there is provided a method of transmitting a packet based on a WPAN, the method comprising: selectively fragmenting an IP packet, which is to be transmitted, according to a packet size; compressing one or more fields to be compressed, which are included in a IP packet header, to a predetermined number of bits; eliminating a field to be eliminated, which is designated differently in the IP packet header according to whether the IP packet is fragmented, thereby generating a converted packet supporting a WPAN; and transmitting the converted packet according to a destination address included in the fields to be compressed.

The step of compressing of the fields to be compressed may be the step of compressing the IP packet header according to MPEG2-TS in upper layer of a Protocol Adaptation Layer (PAL) based on function of the Protocol Adaptation Layer.

The destination address may be designated as a WPAN based address when the converted packet is transmitted into the WPAN The destination address may be designated as an IP based address when the converted packet is transmitted outside the WPAN.

The step of transmitting of the converted packet may be the step of transferring the converted packet to an IEEE 802.15.4 MAC/PHY layer located in a lower layer of a Protocol Adaptation Layer to interwork with the WPAN.

In accordance with another aspect of the present invention, there is provided a packet transferring apparatus comprising: a header compressor for fragmenting an IP packet to be transmitted and compressing at least one field, which is included in a header of the IP packet, to a predetermined number of bits; a packet generator for eliminating at least one field, which is designated differently in the IP packet header according to whether the IP packet is fragmented, and generating a converted packet supporting a WPAN; and a packet transmitter for transmitting the converted packet according to a destination address included in at least one compressed field.

In accordance with another aspect of the present invention, there is provided a method of transmitting a packet based on a WPAN, the method comprising: fragmenting at least one IP packet according to a size of the IP packet; compressing at least one fields, which is included in a header of the IP packet, to a predetermined number of bits; eliminating at least one field, which is designated differently in the header of the IP packet according to whether the IP packet is fragmented, and generating a converted packet supporting a WPAN; and transmitting the converted packet according to a destination address included in the at least one compressed fields.

According to a system and a method for transmitting a packet based on a WPAN of the present invention, it is possible to efficiently transmit an MPEG2-TS packet by using an IEEE 802.15.4 based WPAN through implementing such that an IPv4 based IP packet can be loaded in an IEEE 802.15.4 MAC/PHY packet by minimizing a size of a header through a fragment of the IPv4 based IP packet and a compression of the header. Further, it is possible to execute various applications based on the IPv4 while using the IEEE 802.15.4, which is a low power communication technology, in a mobile device.

BRIEF DESCRIPTION OF THE DRAWINGS

The above and other objects, features and advantages of the present invention will be more apparent from the following detailed description taken in conjunction with the accompanying drawings, in which:

FIG. 3 illustrates a general construction of a header of an IPv4 packet based IP packet.

FIG. 5 is a view for describing an example of setting an address field according to embodiments of the present invention;

FIG. 6 illustrates a structure of a header including an uncompressed field according to embodiments of the present invention.

DETAILED DESCRIPTION OF THE EXEMPLARY EMBODIMENTS

Figure 1:
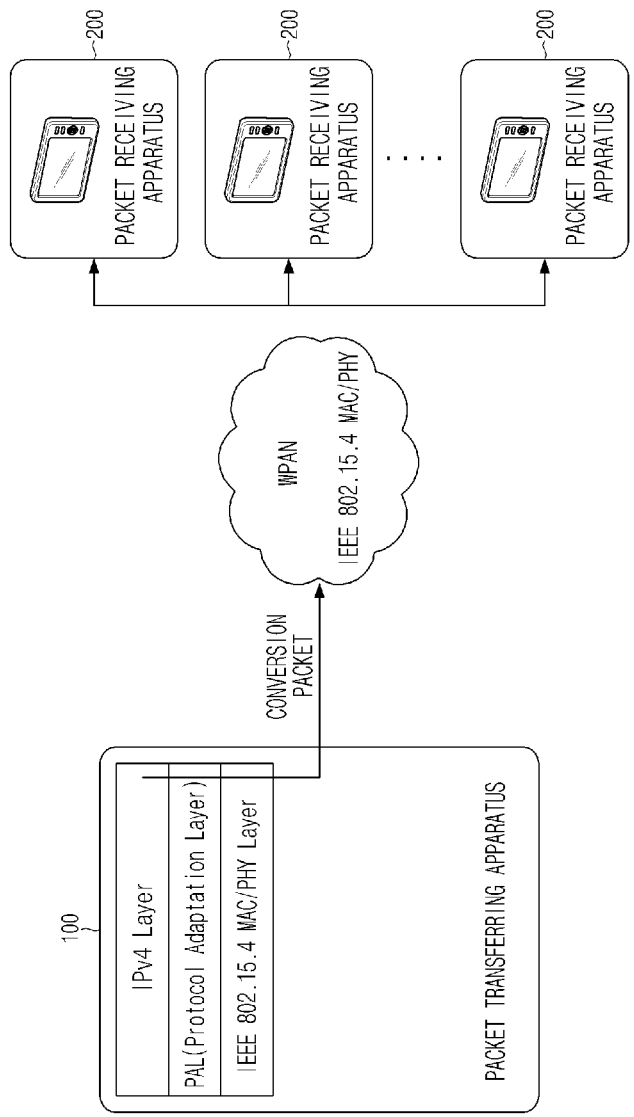
FIG. 1 is a diagram schematically illustrating a WPAN based packet transmission system according to embodiments of the present invention.

Hereinafter, an exemplary embodiment of the present invention will be described with reference to the accompanying drawings. In the following description and drawings, the same reference numerals are used to designate the same or similar components, and so repetition of the description on the same or similar components will be omitted.

FIG. 1 is a diagram schematically illustrating a WPAN based packet transmission system according to embodiments of the present invention.

As shown in FIG. 1, the system includes a packet transferring apparatus 100 for converting an IP packet, which is to be transmitted, to a converted packet supporting a WPAN and transmitting the converted packet, and a packet receiving apparatus 200 for receiving the converted packet transmitted from the packet transferring apparatus and restoring the converted packet to the IP packet.

The packet transferring apparatus 100 provides a Protocol Adaptation Layer (PAL) between an IEEE 802.15.4 MAC/

PHY layer and an IPv4 layer and transfers an IPv4 based IP packet to the IEEE 802.15.4 MAC/PHY layer through a packet fragment and a header compression based on a function of the provided protocol adaptation layer.

For this purpose, the packet transferring apparatus 100 selectively fragments the IP packet according to a size of the IP packet to be transmitted and compresses one or more preset fields to be compressed, which are included in an IP packet header, to the number of setting bits. At this time, a source address and destination address are included in the fields to be compressed. When the IPv4 is loaded on an upper layer of the IEEE 502.15.4 MAC/PHY layer, an IP based address system is used or 16 bit address system, which corresponds to an IEEE 802.15.4 MAC/PHY layer based WPAN address system, may be used. Accordingly, when the packet receiving apparatus 200, which is in a position corresponding to a destination address, is located outside the WPAN, the packet transferring apparatus 100 designates the destination address as an IP based address. On the contrary, when the packet receiving apparatus 200, which is in a position corresponding to a destination address, is located inside the WPAN, the packet transferring apparatus 100 designates the destination address as the 16 bit address corresponding to the WPAN based address system.

Further, the packet transferring apparatus 100 eliminates fields to be omitted, which are designated differently in the IP packet header according to the existence of a fragment of the IP packet to be transmitted, and generates a converted packet supporting the WPAN. More specifically, the packet transferring apparatus 100 eliminates fields to be omitted, which are designated differently in the IP packet header according to the existence of a fragment of the IP packet to be transmitted, sets an uncompressed field according to the elimination, and generates the converted packet supporting the IEEE 802.15.4 MAC/PHY layer located in a lower layer by adding a converted packet header including information on fields to be compressed. Here, the converted packet header may include a compression encoding field for indicating information on the fields to be compressed, a frame control field including information on the IPv4 layer, which corresponds to information on an upper layer, fragment designating information indicating the existence of a fragment of the packet, and information on a fragmented packet (PAL fragmentation sub-header), and an uncompressed field storing the remaining fields of an existing IP packet header except compressed and eliminated fields.

Further, the packet transferring apparatus 100 transmits the generated converted packet according to a destination address included in the fields to be compressed. More specifically, the packet transferring apparatus 100 transfers the converted packet to the IEEE 802.15.4 MAC/PHY layer located in a lower layer based on a protocol adaptation layer function and thus transmits the converted packet to the packet receiving apparatus 200, which is in a position corresponding to the destination address, through an interworking with a WPAN based on the IEEE 802.15.4 MAC/PHY layer.

The packet receiving apparatus 200 receives the converted packet transmitted from the packet transferring apparatus 100 and recovers a preset field omitted during a compression process based on restoration information included in a header of the converted packet to restore the IP packet header. More specifically, the packet receiving apparatus 200 receives the converted packet transmitted from the packet transferring apparatus 100 through an interworking with the WPAN based on the IEEE 802.15.4 MAC/PHY layer. Further, the packet receiving apparatus 200 analyzes the received converted packet based on the protocol adaptation layer function and releases a compression state of the fields to be compressed. Furthermore, the packet receiving apparatus 200 identifies a fragment state of the IP packet and recovers the fields to be omitted, which are eliminated differently according to the existence of the fragment, to restore the IPv4 based IP packet header.

Figure 2:
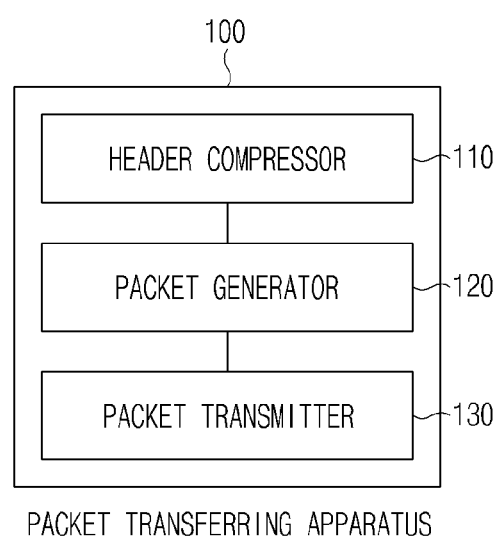
FIG. 2 is a diagram schematically illustrating a packet transferring apparatus according to embodiments of the present invention.

Hereinafter, a more detailed construction of the packet transferring apparatus 100 according to embodiments of the present invention will be described with reference to FIG. 2.

That is, the packet transferring apparatus 100 includes a header compressor 110 for fragmenting an IP packet, which is to be transmitted, and compressing a header, a packet generator 120 for generating a converted packet supporting a WPAN, and a packet transmitter 130 for transmitting the converted packet through an interworking with the WPAN.

Figure 4:
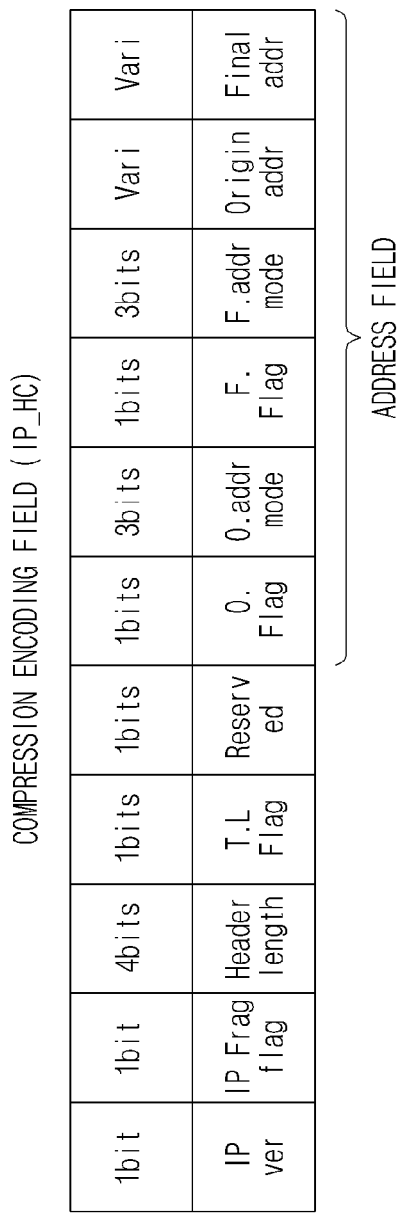
FIG. 4 illustrates a structure of a header including a compression encoding according to embodiments of the present invention.

The header compressor 110 compresses one or more preset fields to be compressed, which are included in a header of an IPv4 based IP packet located in an upper layer, based on a Protocol Adaptation Layer (PAL) function to the number of setting bits, and sets a compression encoding field (IP_HC) indicating information on fields to be compressed as shown in FIG. 4.

More specifically, a detailed operation of the header compressor 110 will be described with reference to FIG. 3 illustrating a detailed structure of the IPv4 header and FIG. 3 illustrating the compression encoding field.

That is, a 4 bit "version" field of the IPv4 header is indicated by a value of "0b0" in an "IP ver" field of the compression encoding field (IP_HC). Further, a 4 bit "Header length" field of the IPv4 header is indicated in a "Header length" field of the compression encoding field (IP_HC) and a value of the 4 bit "Header length" field of the IPv4 header is used without any change. For example, an IPv4 header having no "option" field is 20 bytes long and the IPv4 header has a value calculated as "5" words. A "Header length" field of the compression encoding field (IP_HC) is indicated as "0b0101". Further, when an "option" field which is 4 bytes long is included in the IPv4 header, the IPv4 header has a value calculated as "6" words. The "Header length" field of the compression encoding field (IP_HC) is indicated as "0b0110". Further, when a value of a "flags" field is "0b010", a value of a "Frag flag" of the compression encoding field (IP_HC) is indicated as "0b0". Furthermore, when values of a "flags" field are "0b000" and "0b001", a value of the "Frag flag" field is indicated as "0b0".

Further, the header compressor 110 sets an address field including a source address and destination address as shown in FIG. 4. When the IPv4 is loaded on a higher layer of the IEEE 802.15.4 MAC/PHY layer, an IP based address system is used or a 16 bit address system, which corresponds to an IEEE 802.15.4 MAC/PHY layer based WPAN address system is used. Accordingly, the header compressor 110 designates a destination address as an IP based address when the packet receiving apparatus 200, which is in a position corresponding to the destination address, is located outside the WPAN. On the contrary, the header compressor 110 designates the destination address as the 16 bit address, which corresponds to the WPAN based address system, when the packet receiving apparatus 200, which is in a position corresponding to the destination address, is located inside the WPAN.

For example, an example of setting address fields of the header compressor 110 is discussed in the following description with reference to FIG. 5. That is, an object transmitting/receiving an IP packet is designated as a device ①, a device ②, an Access Point (AP), and an Internet server and an address of each object is set as follows.

Device ①→IP address 192.168.123.101, 64 bit MAC address AA:AA: . . . :AA:A1, ZigBee short address 205

Device ②→IP address 192.168.123.105, 64 bit MAC address AA:AA: . . . :AA:A5, ZigBee short address 158

Access Point (AP)→IP address 192.168.123.1, 64 bit MAC address AA:AA: . . . :AA:00, ZigBee short address 1

Internet server→IP address 206.190.60.37, 48 bit MAC address 10:08:25:A4:D8:4A, ZigBee short address none 1. First example—A device ① transmits data to an access point by using a 16 bit address and the access point transmits the data to another device, which is a device ②.
   1) Device ①→AP (FIG. 5A)
   O.Flag=0b0, F.Flag=0b1
   O.addr mode=0b0 F.addr mode=0b1
   2) AP→Device ② (FIG. 5B)
   O.Flag=0b1, F.Flag=0b0
   O.addr mode=0b001 F.addr mode=0b000

2. Second example—The device ① transmits data to an Internet server.
   1) Device ①→AP (FIG. 5C)
   O.Flag=0b0, F.Flag=0b011
   O.addr mode=0b000 F.addr mode=0b011
   2) AP→Internet server
   A general IP based address is used.

3. Third example—The Internet server transmits data to the device ①
   1) Internet server→AP
   A general IP based address is used.
   2) AP→Device ① (FIG. 5D)
   O.Flag=0b1, F.Flag=0b0
   O.addr mode=0b011 F.addr mode=0b000

The packet generator 120 eliminates fields to be omitted, which are designated differently in the IP packet header according to the existence of a fragment of the IP packet, and generates a converted packet supporting the WPAN. More specifically, the packet generator 120 eliminates fields to be omitted, which are differently designated in the IP packet header according to the existence of a fragment of the IP packet, and sets an uncompressed header according to the elimination as shown in FIG. 6. Further, the packet generator 120 adds a converted packet header including information on the fields to be omitted and generates the converted packet supporting the IEEE 802.15.4 MAC/PHY layer located in a lower layer.

Furthermore, a detailed operation of the packet generator 120 is discussed in the following description with reference to FIG. 3 illustrating the detailed structure of the IPv4 header and FIG. 6 illustrating a structure of the uncompressed header.

That is, an 8 bit "TOS" field of the IPv4 header is indicated in a "TOS" field of the uncompressed header and a value of the 8 bit "TOS" field of the IPv4 header is used without a change. Further, when a value of a "Flags" field of the IPv4 header is "0b010" (IP packet is not fragmented) and a value of a "Total length" field of the IPv4 header is the same as or smaller than "2047" (a value of the "Total length" field is the same as or smaller than "0x7FF"), a 16 bit "Total length" field of the IPv4 header becomes the same as a value of "Total length" of fragmented packet information (PAL fragmentation sub-header), so that the value of the "Total length" field of the IPv4 header is deleted and a value of a "Total length flag" field of the uncompressed encoding field (IP_HC) shown in FIG. 3 becomes "0b1". Moreover, when a value of the "Flags" of the IPv4 header is "0b010" (IP packet is not fragmented) and a value of an "IP total length" field is the same as or larger than "2047" (a value of "Total length" is the same as or larger than "0x7FF") or values of a "Flags" field of the IPv4 header are "0b000" and "0b001" (IP packet is fragmented), a value of the 16 bit "Total length" field of the IPv4 header is indicated in a "Total length" field of the uncompressed header without any change and a value of a "Total length flag" field of the compressed encoding field (IP_HC) becomes "0b0". Further, when a value of a "flags" field of the IPv4 header is "0b010", a 16 bit "Identification" field of the IPv4 header is deleted. When values of a "Flags" field of the IPv4 header are "b000" and "0b011", the 16 bit "Identification" field of the IPv4 header is indicated in an "Identification" field of the uncompressed header and a value of the 16 bit "Identification" field of the IPv4 header is used without any change. Furthermore, values of a "Flags" field of the IPv4 header are "0b000" and "0b001" (IP packet is fragmented), a 3 bit "Flags" field is indicated in a "Flags" field of the uncompressed header and the value of "Flags" of the IPv4 header is used without any change. When a value of "Flags" of the IPv4 header is "0b010" (IP packet is not fragmented), a value of a 13 bit "Fragment offset" field always has "0b0 0000 0000 0000", so that the value can be deleted. Meanwhile, values of the "Flags" field of the IPv4 header are "0b000" and "0b001" (IP packet is fragmented), a 13 bit "Fragment offset" field of the IPv4 header is indicated in a "Fragment offset" field of the uncompressed header and a value of the 13 bit "Fragment offset" field of the IPv4 header is used without any change. Further, an 8 bit "TTL" field of the IPv4 header is indicated in a "TTL" field of the uncompressed header and a value of the 8 bit "TTL" field of the IPv4 header is used without any change. For reference, an 8 bit "Protocol" field of the IPv4 header is indicated in a higher layer information list included in a "Frame control" field of the converted packet header. Here, values of a main protocol of the IPv4 header are indicated as "0x01 (ICMP)", "0x02 (IGMP)", "0x06 (TCP)", "0x11(UDP)", "0x59 (OSPF)", "0x84 (SCTP)", "0x01 (ICMP)=0x03 (ICMP/IP)", "0x06 (TCP)=0x1 (TCP/IP)", and "0x11 (UDP)=0x2 (UDP/IP)", respectively. Further, a "MAC CRC" field, which corresponds to a lower field, determines an error instead of a "Header checksum" field of the IPv4 header. Accordingly, when an error is not detected in a "CRC" field, a "Header checksum" field can be compressively eliminated and a decompression value of "Checksum" is calculated and inputted.

The packet transmitter 130 transmits the generated converted packet according to a destination address included in the fields to be compressed. More specifically, the packet transmitter 130 transmits the converted packet of an IEEE 802.15.4 MAC/PHY layer located in a lower layer based on a protocol adaptation layer function, so that the packet transmitter 130 can transmit the converted packet to the packet receiving apparatus 200, which is in a position corresponding to the destination address, through an interworking with a WPAN based on the IEEE 802.15.4 MAC/PHY layer.

As described above, according to the system for transmitting the packet based on the WPAN, the IPv4 and a higher protocol of the IPv4 perform a TCP/UDP based IP packet fragment and a header compression and minimizes a header size, so that it can be implemented that the IPv4 is loaded in an IEEE 802.15.4 MAC/PHY packet having a small payload. As a result, it is possible to efficiently transmit an IPv4 packet through an interworking with an IEEE 802.15.4 based WPAN.

Figure 7:
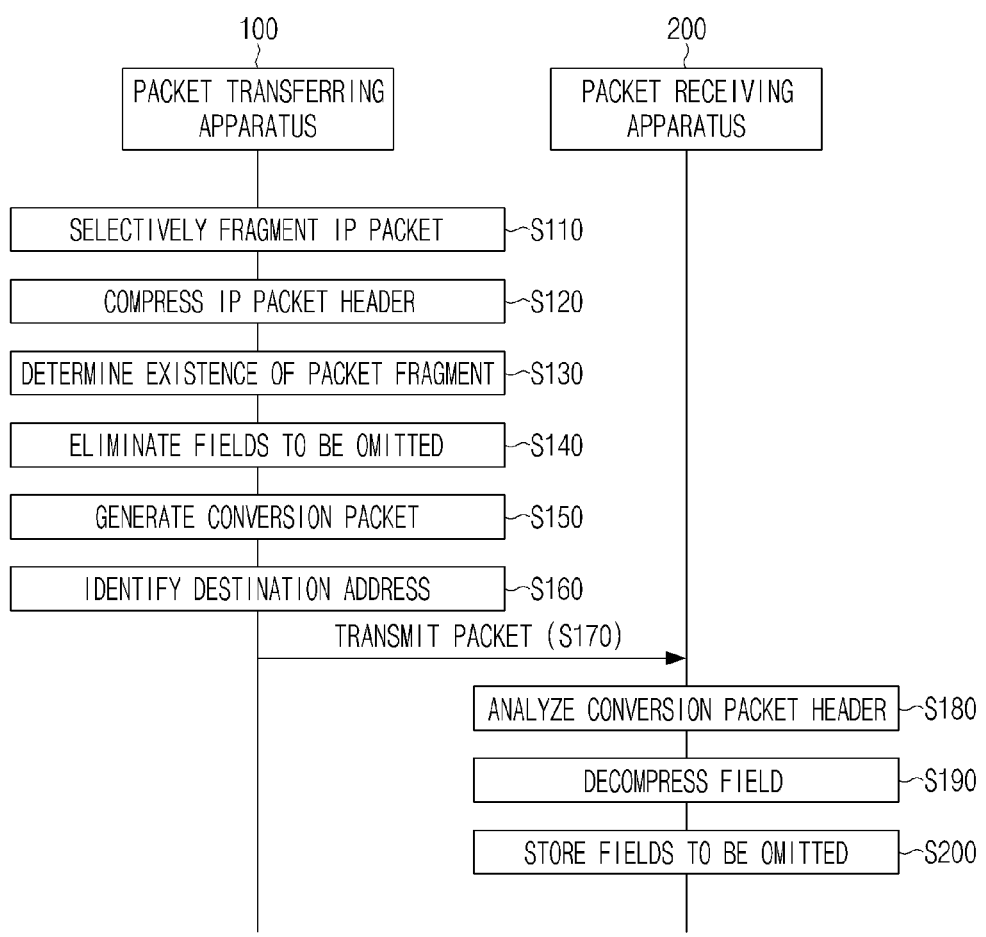
FIGS. 7 and 8 are flowcharts for illustrating a WPAN based packet transmission method according to embodiments of the present invention.
Figure 8:
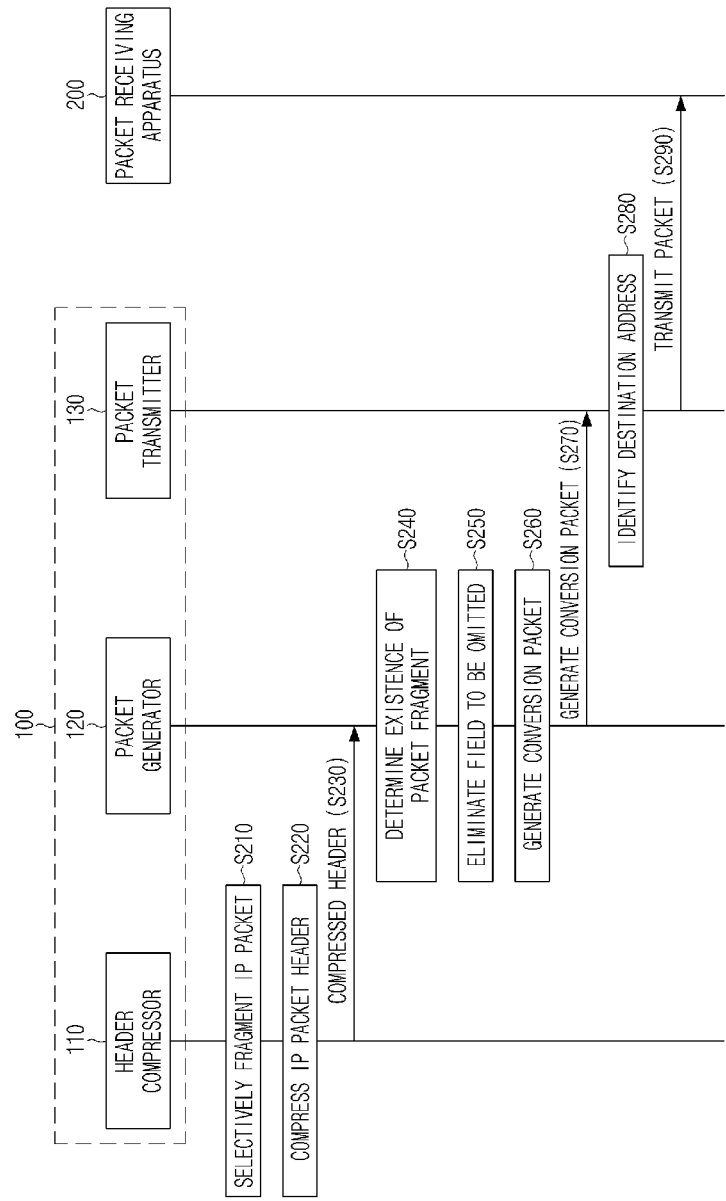

Hereinafter, a method of transmitting a packet based on the WPAN according to embodiments of the present invention will be described with reference to FIGS. 7 and 8. Here, for convenience of the description, constructions illustrated in FIGS. 7 and 8 are described by using corresponding reference numerals of the constructions illustrated in FIGS. 1 to 6.

First, a driving method of the packet transmission system based on the WPAN according to embodiments of the present invention is described with reference to FIG. 7.

The packet transferring apparatus 100 selectively fragments an IP packet to be transmitted in consideration of a packet size S110.

Next, the packet transferring apparatus 100 compresses a header of the IP packet to be transmitted S120. Preferably, the packet transferring apparatus 100 compresses one or more preset fields to be compressed, which are included in the header of the IP packet to be transmitted, to the number of setting bits. At this time, the fields to be compressed include a source address and destination address. When the IPv4 is loaded on a higher layer of an IEEE 802.15.4 MAC/PHY layer, an IP based address system is used or a 16 bit address system, which corresponds to an IEEE 802.15.4 MAC/PHY layer based WPAN address system, may be used. Accordingly, the packet transferring apparatus 100 designates the destination address as an IP based address when the packet receiving apparatus 200, which is in a position corresponding to the destination address, is located outside the WPAN. On the contrary, the packet transferring apparatus 100 designates the destination address as a 16 bit address, which corresponds to a WPAN based address, when the packet receiving apparatus 200, which is in a position corresponding to the destination address, is located inside the WPAN.

Next, the packet transferring apparatus 100 eliminates fields to be omitted, which are designated differently in the IP packet header according to the existence of a fragment of the IP packet, and generates a converted packet supporting the WPAN S130 to S150. Preferably, the packet transferring apparatus 100 eliminates fields to be omitted, which are designated differently in the IP packet header according to the existence of a fragment of the IP packet and sets uncompressed headers according to the elimination. Further, the packet transferring apparatus 100 adds a converted packet header including information on the fields to be omitted and generates the converted packet supporting an IEEE 802.15.4 MAC/PHY layer located in a lower layer. Here, the converted packet header may include a compression encoding field for indicating information on the fields to be compressed, a frame control field including information on the IPv4 layer, which corresponds to information on a higher layer, fragment designating information indicating the existence of a fragment of the packet, and information on a fragmented packet (PAL fragmentation sub-header), and an uncompressed field storing the remaining fields of an existing IP packet header except for compressed and eliminated fields.

Next, the packet transferring apparatus 100 transmits the generated converted packet according to a destination address included in the fields to be compressed S160 to S170. Preferably, the packet transferring apparatus 100 transfers the converted packet to the IEEE 802.15.4 MAC/PHY layer located in a lower layer based on a protocol adaptation layer function and thus transmits the converted packet to the packet receiving apparatus 200, which is in a position corresponding to the destination address, through an interworking with the IEEE 802.15.4 MAC/PHY layer based WPAN.

Next, the packet receiving apparatus 200 receives the converted packet transmitted from the packet transferring apparatus 100 through an interworking with the IEEE 802.15.4 MAC/PHY layer based WPAN and releases a compression state of the fields to be compressed, by analyzing the received converted packet header based on a protocol adaptation layer function S180-S190.

Next, the packet receiving apparatus 200 identifies a fragment state of the IP packet and recovers fields to be omitted, which are eliminated differently according to the existence of the fragment of the IP packet to restore the IP packet header based on the IPv4 S200.

Hereinafter, a more detailed operation of the packet transferring apparatus 100 will be described with reference to FIG. 8.

First, an IP packet to be transmitted is selectively fragmented according to a packet size S210. Preferably, the header compressor 110 selectively fragments the packet according to a size of the IP packet based on the IPv4 located in an upper layer according to a Protocol Adaptation Layer (PAL) function.

Next, one or more preset fields to be compressed, which are included in the header of the IP packet to be transmitted, are compressed to the number of setting bits S220 to S230. Preferably, the header compressor 110 compresses one or more preset fields to be compressed, which are included in the header of the IP packet based on the IPv4 located in an upper layer, to the number of setting bits according to the PAL function, and sets a compression encoding field indicating information on a field to be compressed.

Next, fields to be omitted, which are designated differently in the IP packet header according to the existence of a fragment of the IP packet, are eliminated and a converted packet supporting the WPAN is generated S240 to S270. Preferably, the packet generator 120 eliminates fields to be omitted, which are designated differently in the IP packet header according to the existence of a fragment of the IP packet and sets an uncompressed header according to the elimination. Further, the packet generator 120 adds a converted packet header including information on the fields to be compressed and generates the converted packet supporting the IEEE 802.15.4 MAC/PHY layer located in a lower layer.

Next, the generated converted packet is transmitted according to the destination address included in the fields to be compressed S280 to S290. Preferably, the packet transmitter 130 transfers the converted packet to the IEEE 802.15.4 MAC/PHY layer located in a lower layer based on the PAL function and the converted packet is transmitted to the packet receiving apparatus 200 through an interworking with the WPAN based on the IEEE 802.15.4 MAC/PHY layer.

As described above, according to the method of transmitting the packet based on the WPAN according to embodiments of the present invention, the IPv4 and a higher protocol of the IPv4 perform a TCP/UDP based IP packet fragment and a header compression and minimize a header size, so that it can be implemented that the IPv4 is loaded in an IEEE 802.15.4 MAC/PHY packet having a small payload. As a result, it is possible to efficiently transmit an IPv4 packet through an interworking with an IEEE 802.15.4 based WPAN.

Although an exemplary embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

According to the system and the method for transmitting a packet based on a WPAN of the present invention, the present invention has an industrial applicability in that the IPv4 and a higher protocol of the IPv4 perform an IPv4 based IP packet fragment and a header compression and minimize a header size, so that it can be implemented that the IPv4 is loaded in an IEEE 802.15.4 MAC/PHY packet having a small payload. Therefore, the present invention has great potential in commercialization of the apparatus using and employing the related technologies as the apparatus surpasses a limitation of the conventional technology.

What is claimed is:

1. A packet transferring apparatus, comprising:
a header compressor configured to
fragment an IP packet to be transmitted,
compress at least one field, which is included in a header of the IP packet, to a predetermined number of bits, and
set a compression encoding field indicating information on the compressed at least one field;
a packet generator configured to
determine that a fragment of the IP packet exists,
eliminate at least another field, which is designated differently in the header of the IP packet according to whether the IP packet is fragmented or not,
set an uncompressed field according to the elimination,
generate a converted packet header from the header of IP packet, the converted packet header including information on the eliminated at least another field, and
generate a converted packet supporting a wireless personal area network (WPAN) by using the fragmented IP packet and the converted packet header the header; and
a packet transmitter configured to
identify a destination address included in the compressed at least one field,
transmit the generated converted packet according to the identified destination address.

2. The packet transferring apparatus as claimed in claim 1, wherein the header compressor is configured to compress the header of the IP packet based on a function of a Protocol Adaptation Layer, and the IP packet is an MPEG2-TS packet.

3. The packet transferring apparatus as claimed in claim 1, wherein the header compressor is configured to designate the destination address as a WPAN based address when the generated converted packet is transmitted through the WPAN.

4. The packet transferring apparatus as claimed in claim 1, wherein the header compressor is configured to designate the destination address as an IP based address when the generated converted packet is transmitted outside the WPAN.

5. The packet transferring apparatus as claimed in claim 2, wherein the packet transmitter is configured to transfer the generated converted packet to an IEEE 802.15.4 MAC/PHY layer located in a lower layer of the Protocol Adaptation Layer.

6. A method of transmitting a packet, the method comprising:
fragmenting at least one IP packet according to a size of the IP packet;
compressing at least one field, which is included in a header of the IP packet, to a predetermined number of bits;
setting a compression encoding field indicating information on the compressed at least one field;
determining that a fragment of the IP packet exists;
eliminating at least another field, which is designated differently in the header of the IP packet according to whether the IP packet is fragmented or not;
setting an uncompressed field according to the elimination;
generating a converted packet header from the header of IP packet, the converted packet header including information on the eliminated at least another field;
generating a converted packet supporting a wireless personal area network (WPAN) by using the fragmented IP packet and the converted packet header;
identifying a destination address included in the compressed at least one field; and
transmitting the generated converted packet according to the identified destination address.

7. The method as claimed in claim 6, wherein the compressing of the at least one field is based on a function of a Protocol Adaptation Layer, and the IP packet is an MPEG2-TS packet.

8. The method as claimed in claim 6, wherein the destination address is designated as a WPAN based address when the generated converted packet is transmitted through the WPAN.

9. The method as claimed in claim 6, wherein the destination address is designated as an IP based address when the generated converted packet is transmitted outside the WPAN.

10. The method as claimed in claim 7, wherein the generated converted packet is transferred to an IEEE 802.15.4 MAC/PHY layer located in a lower layer of the Protocol Adaptation Layer.

11. The packet transferring apparatus as claimed in claim 1, wherein the compression encoding field includes at least one selected from the group consisting of:
a version field of the header of the IP packet;
a header length field of the header of the IP packet;
an option field;
a flags field; and
a Frag flag field.

12. The packet transferring apparatus as claimed in claim 1, wherein the header compressor is configured to further set an address field including a source address and the destination address.

13. The method as claimed in claim 6, wherein the compression encoding field includes at least one selected from the group consisting of:
a version field of the header of the IP packet;
a header length field of the header of the IP packet;
an option field;
a flags field; and
a Frag flag field.

14. The method as claimed in claim 6, further comprising setting an address field including a source address and the destination address.

15. The packet transferring apparatus as claimed in claim 1, wherein the converted packet header includes at least one selected from the group consisting of:
the set compression encoding field for indicating information on the compressed at least one field;
a frame control field including information on the IPv4 layer, which corresponds to information on an upper layer;
fragment designating information indicating the existence of a fragment of the IP packet;
information on the fragmented IP packet; and
the uncompressed field storing the remaining fields of an existing IP packet header except the compressed at least one field and the eliminated at least another field.

16. The method as claimed in claim 6, wherein the converted packet header includes at least one selected from the group consisting of:
the set compression encoding field for indicating information on the compressed at least one field;
a frame control field including information on the IPv4 layer, which corresponds to information on an upper layer;

fragment designating information indicating the existence of a fragment of the IP packet;
information on the fragmented IP packet; and
the uncompressed field storing the remaining fields of an existing IP packet header except the compressed at least one field and the eliminated at least another field.

* * * * *